United States Patent [19]

Small

[11] Patent Number: 4,684,934

[45] Date of Patent: Aug. 4, 1987

[54] METHOD AND APPARATUS FOR STORING AND RETRIEVING KEYBOARD LED DATA

[75] Inventor: Larry A. Small, Austin, Tex.

[73] Assignee: Data General Corporation, Westboro, Mass.

[21] Appl. No.: 470,697

[22] Filed: Feb. 28, 1983

[51] Int. Cl.$^4$ .............................................. G09G 3/00
[52] U.S. Cl. .................................... 340/712; 340/711; 340/365 E; 340/365 S; 340/802
[58] Field of Search ................... 340/711, 712, 365 S, 340/365 E, 802; 179/99 M

[56] References Cited

U.S. PATENT DOCUMENTS

| Re. 31,942 | 7/1985 | Klehm, Jr. | 340/365 E |
|---|---|---|---|
| 3,675,239 | 7/1972 | Ackerman et al. | 340/365 E |
| 4,115,870 | 9/1978 | Lowell | 340/711 X |
| 4,234,933 | 11/1980 | Adelson et al. | 340/711 X |
| 4,298,793 | 11/1987 | Melis et al. | 340/712 X |
| 4,327,994 | 5/1982 | Barley et al. | 340/711 X |
| 4,344,065 | 8/1982 | Erwin et al. | 340/711 X |
| 4,358,715 | 11/1982 | Dinges et al. | 340/711 X |
| 4,390,866 | 6/1983 | Engstrom | 340/365 E |
| 4,394,087 | 7/1983 | Irie et al. | 340/712 X |
| 4,412,473 | 11/1983 | Laflamme | 340/711 X |
| 4,551,583 | 11/1985 | Sekiguchi et al. | 179/99 M |

Primary Examiner—Gerald L. Brigance
Attorney, Agent, or Firm—Robert L. Dulaney

[57] ABSTRACT

An apparatus and method for storing and retrieving information indicative of the state of a plurality of keyboard LED's is disclosed. A RAM is employed to store the current status of all keyboard LED's. Programmed array logic cyclically generates RAM addresses to cause RAM data to be supplied to an LED array. The RAM addresses are also supplied to a decoder to generate additional LED array activation signals. LED's which are activated by both a RAM data output and a decoder output are illuminated. Each RAM address affects a different subset of the keyboard LED's. The programmed array logic generates each RAM address several times per second such that the LED's which are activated appear to be constantly on. Apparatus is also disclosed to update the data stored in the RAM.

4 Claims, 7 Drawing Figures

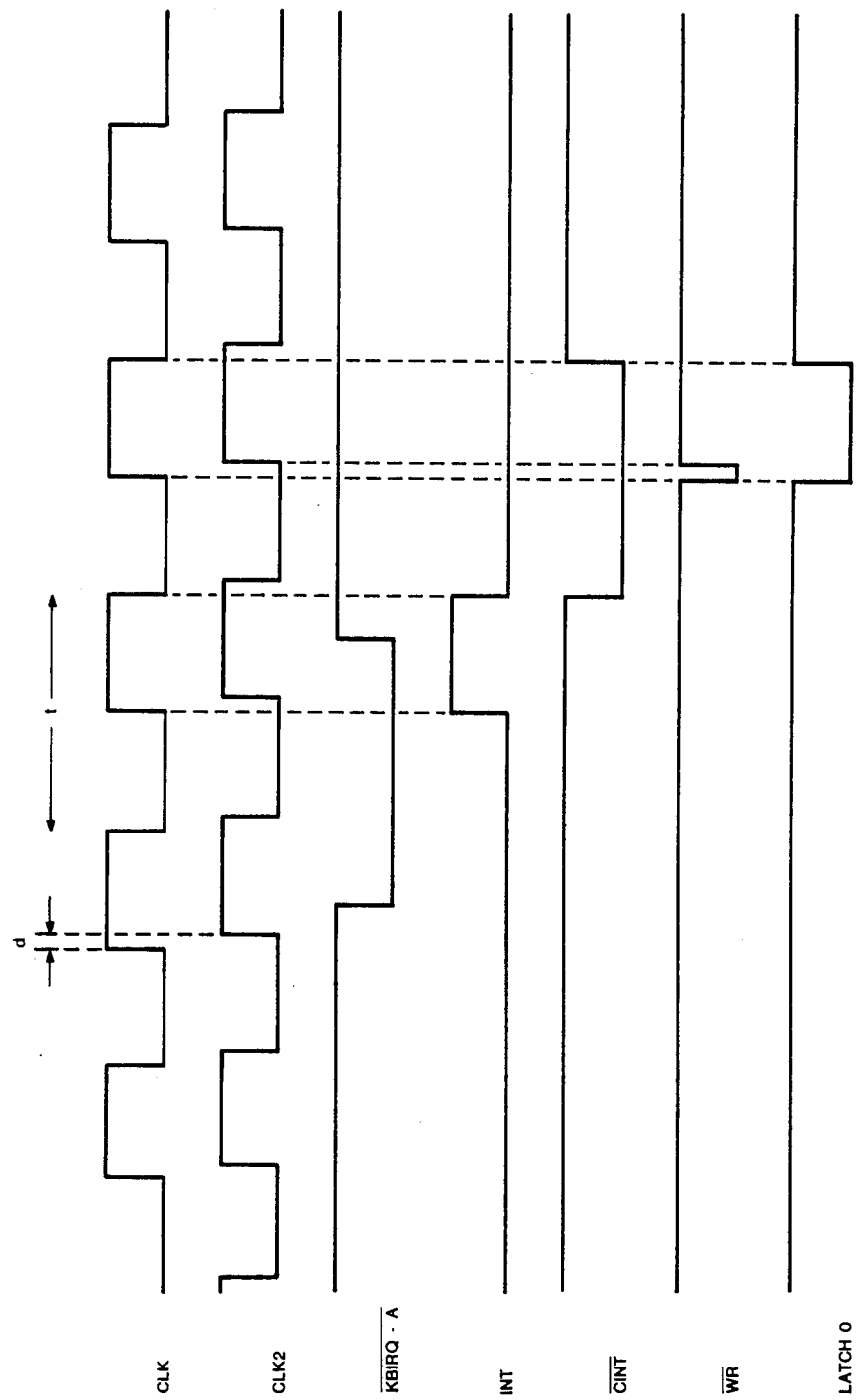

METHOD AND APPARATUS FOR STORING AND RETRIEVING KEYBOARD LED DATA

CROSS REFERENCE TO RELATED APPLICATIONS

The present application is related, in part, to copending U.S. patent application Ser. No. 470,698 filed Feb. 28, 1983.

The subject matter of the present application is also related in part to the subject matter disclosed in U.S. Pat. No. 4,459,581 filed July 21, 1981 and issued July 10, 1984.

BACKGROUND OF THE INVENTION

1. Field of the Invention

The present invention relates generally to keyboards for use with video display terminals and specifically to a keyboard having apparatus for receiving, storing and retrieving data related to the state or operation of the keyboard light emitting diodes and bell tone generators.

2. Description of the Prior Art

Keyboards for use with video display terminals typically have one or more indicators, usually light emitting diodes (LED's), which indicate terminal status to the user. Some newer keyboards, especially those designed for use with graphics terminals, have a comparatively large number of LED's.

In the prior art, each keyboard LED typically was activated by a dedicated wire from the terminal or keyboard electronics. As the number of LED's increases, however, the number of required wires, latches and the amount of printed circuit board etching required to support the LED's begins to become a significant consideration in keyboard design. The present invention relates to a novel circuit and method for resolving these and other prior art problems.

SUMMARY OF THE INVENTION

The present invention relates to a terminal keyboard having novel structure for storing and retrieving LED status information. A preferred embodiment of the invention incorporates a clock apparatus for generating a timing signal, a memory, decoder logic, logic apparatus for providing addresses to the memory and the decoder logic, apparatus for activating selected LED's in response to the outputs of the memory and the decoder logic and apparatus for revising the data stored in the memory.

It is another feature of the invention that the apparatus for revising the memory data will interrupt the logic apparatus for providing addresses, update the data at one memory location, and reactivate the logic apparatus.

It is an advantage of the present invention that the amount of keyboard hardware and the amount of printed circuit load etching required is reduced.

It is another advantage that the overall cost of the keyboard is reduced.

Other features and advantages of the present invention will be understood by those of ordinary skill in the art after referring to the detailed description of the preferred embodiment and drawings herein.

BRIEF DESCRIPTION OF THE DRAWINGS

FIG. 6 is a timing diagram illustrating operation of LED/bell logic 157.

DESCRIPTION OF THE PREFERRED EMBODIMENT

Figure 1:
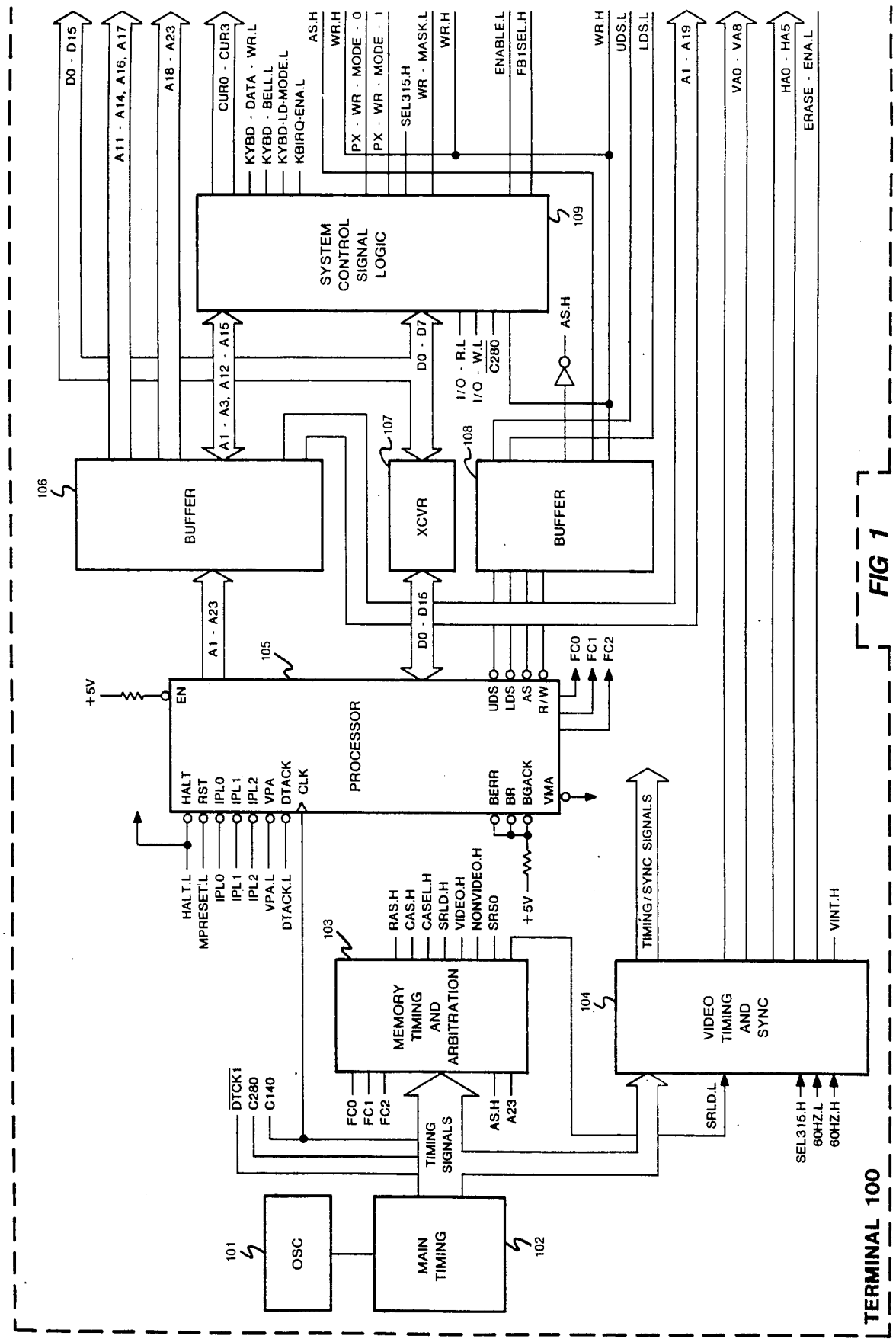
FIG. 1 and 1A are is a block diagram of terminal 100.
Figure 1A:
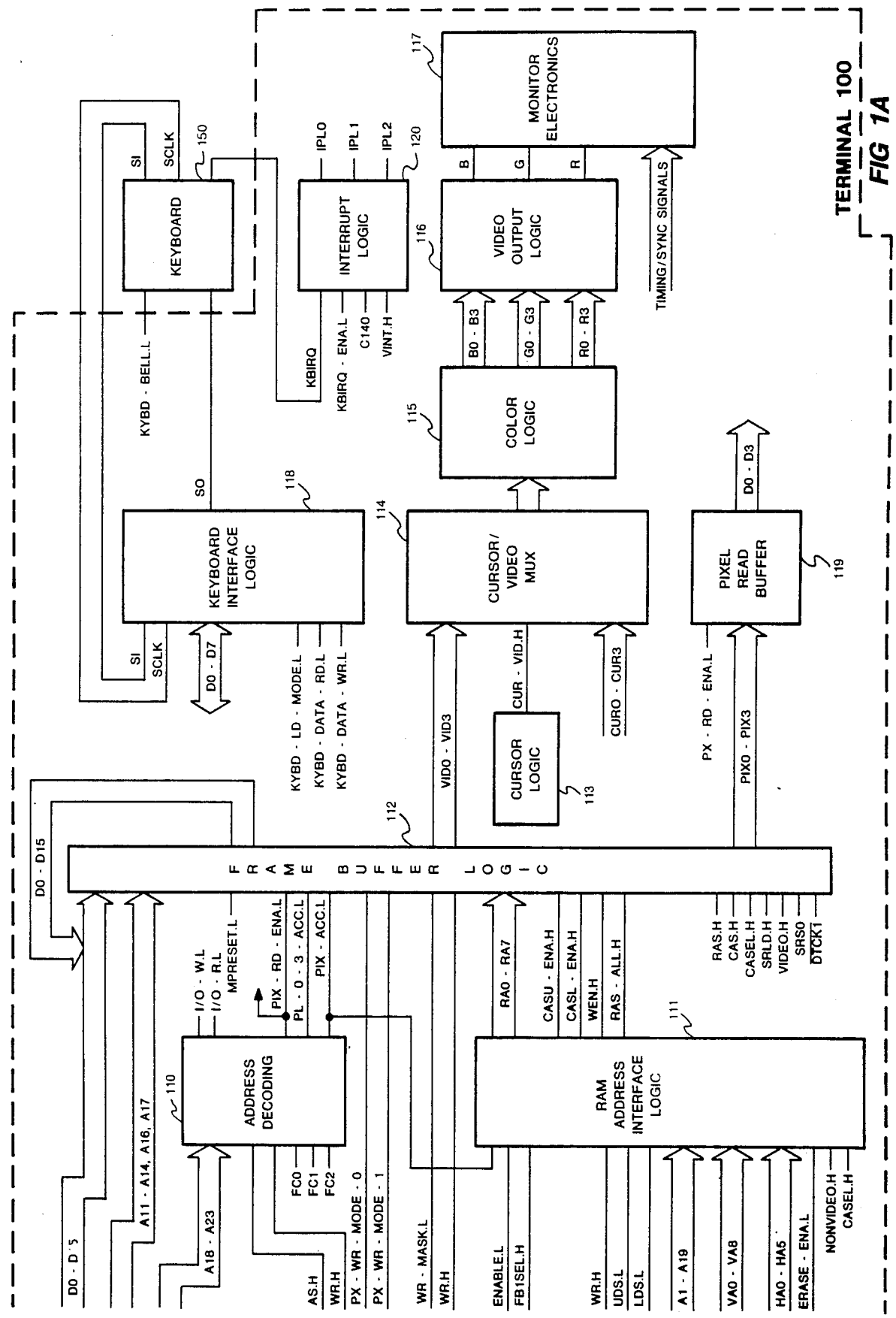

FIGS. 1 and 1A show a block diagram of display terminal 100. The operation of terminal 100 is generally under the supervision and control of processor 105, for example a Motorola MC68000, by means of address lines A1–A23, bidirectional data lines D0–D15 and other discrete output lines discussed in more detail below. Timing signals for all terminal 100 operations are generated by main timing 102 and distributed throughout the system. Memory timing and arbitration 103 generates the particular timing signals required for proper operation of frame buffer logic 112. Video timing and sync 104, based on the scan mode of the terminal, the external power available and certain timing signals from main timing 102 and memory timing and arbitration 103 generates 6 bits of information indicating the horizontal location of the electron beam and 9 bits of information indicating the vertical position of the beams. In addition, vertical timing and sync 104 provides a vertical blanking interrupt signal VINT.H to interrupt logic 120 and various timing and synchronizing signals required by monitor electronics 117 (e.g. composite sync, horizontal sync, vertical sync and composite blank signals).

Frame buffer logic 112 receives data and address information from processor 105, enabling and control inputs from address decoding 110 and system control signal logic 109, RAM address and control information from RAM address interface logic 111 and timing signals from memory timing and arbitration 103. Based on these signals, data or instructions will either be retrieved from or stored in the proper locations in the frame buffer logic 112 RAM memory. Information to be returned to processor 105 is provided over data lines D0–D15. The 4 bits of information for the pixel to be displayed is provided at the pixel rate over lines VID-0–VID3. Cursor/video multiplexer 114 receives the video information and, at the appropriate horizontal and vertical positions, integrates the cursor display information with the video data stream. The pixel information is then provided to color logic 115 where the four bits of pixel information are used to select one of 16 colors for display. Color logic 115 outputs four bits of blue, four bits of green and four bits of red information to video output logic 116 where the blue, green and red analog signals are generated for use by monitor electronics 117. Pixel information PIX0–PIX3 is held in pixel read buffer 119 and made available to CVR 107 over data lines D0–D3. Interrupt logic 120 provides interrupt signals IP0–IP2 to processor 105 based on keyboard interrupt signal KBIRQ, vertical interrupt signal VINT.H or other interrupt conditions not shown.

Keyboard interface logic 118 receives a clocking signal and serial data from keyboard 150 and control information from system control signal logic 109. Interface logic 118 receives data from and makes data available to processor 105 over data lines D0–D7. Data to be sent to keyboard 150 is provided over serial data line S0. A bell activation signal is provided to keyboard 150 from system control signal logic 107. The design and operation of terminal 100 is described in more detail in copending application Ser. No. 470,698.

Figure 2:
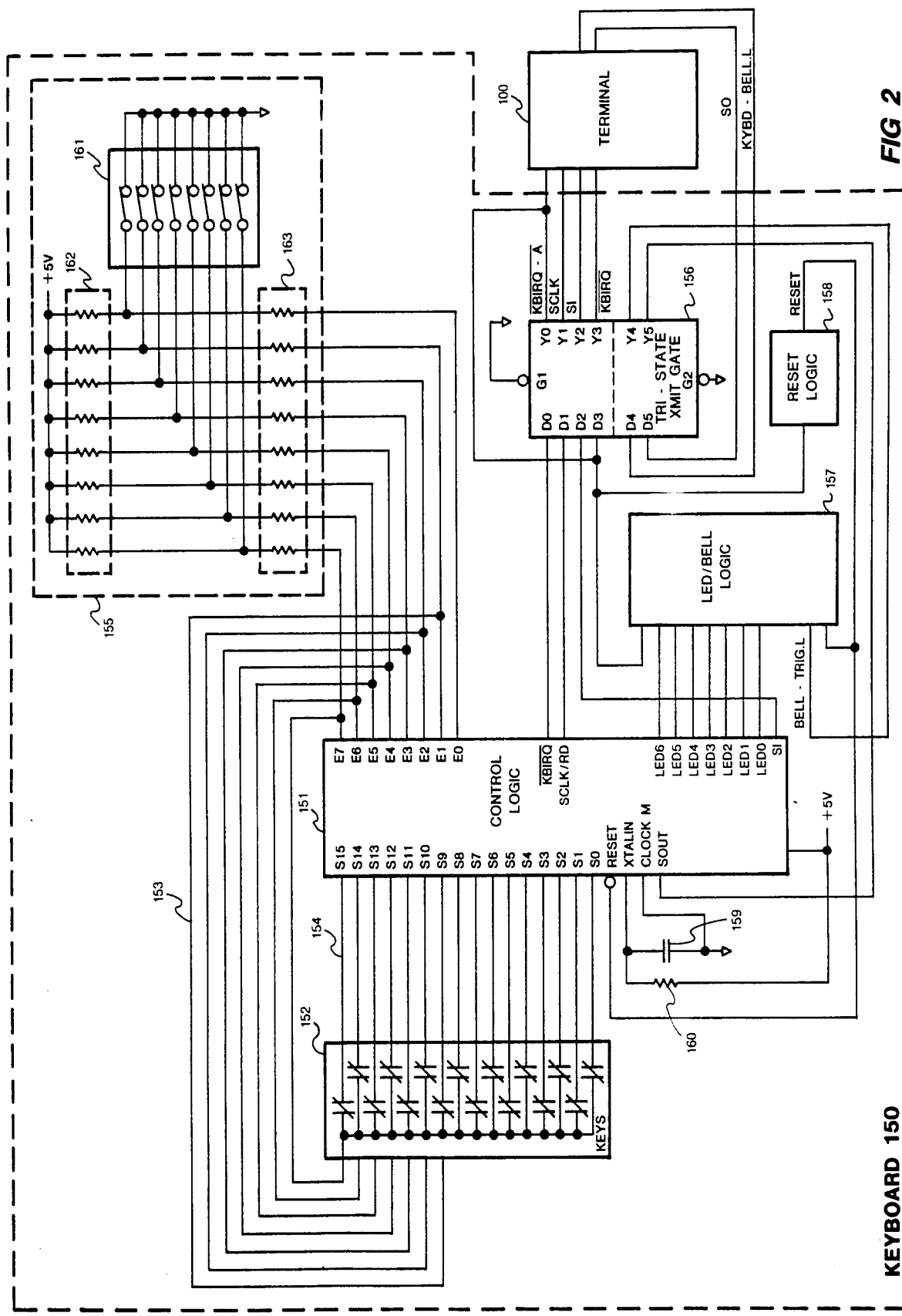
FIG. 2 is a schematic diagram of keyboard 150.

FIG. 2 shows a schematic diagram of a keyboard of a type with which the present invention may be employed. Control logic 151 is connected to keys 152 by a plurality of excitation lines 153 and a plurality of sense lines 154. Control logic 151 is also connected to tri-state gate 156, language identification logic 155, reset logic 158, and LED/bell logic 157. Keyboard 150 supplies a serial data bit stream (SI), a bit stream clocking signal (SCLK), and an interrupt request (NOTKBIRQ) to terminal 100. Control logic 151 periodically tests keys 102 to determine if a change in a key position has occurred since the last test sequence. Whenever control logic 151 detects a position change in one of keys 152, the information identifying the specific key location is serially transmitted to terminal 100 on SI along with SCLK to allow the data to be properly decoded. NOTKBIRQ is transmitted whenever control logic 151 sends key position change information to terminal 100. If, however, eight complete scans of keys 152 have occurred with no change in any key position being detected, NOTKBIRQ will be "artificially" generated and transmitted. Transmission of NOTKBIRQ is necessary, even in the absence of key activity, to provide terminal 100 with the opportunity to send LED or bell information to keyboard 150.

Control logic 151 is implemented in this embodiment as a single chip incorporating all keyboard control functions, including clock generation, LED/bell logic 157 interface, terminal 100 interface, and keys 152 position testing. The design and operation of control logic 151 is described in detail in U.S. Pat. No. 4,459,581. Use of a single chip is not, however, required to practice the subject invention and keyboard 150 could be implemented with a plurality of separate circuits to perform the operations of control logic 151. All communications from control logic 151 to terminal 100 and vice versa pass through tri-state transmit gate 156 (for example, a 74LS367).

English and European language keyboards typically have approximately 100 individual keys. Lines E1-E7 of excitation lines 153 are each connected to up to 16 keys. Each key of keys 152 is connected to one of sense lines 154 (i.e. S0-S15). Excitation line E0 is not required in the key testing process because the sense lines for each of 7 excitation lines provides capability to test up to 112 keys, which is adequate for this embodiment. Use of excitation line E0 would allow testing of an additional 16 keys, if required.

Keyboard 150 is implemented as a "capacitive" keyboard, i.e. keys 152 are constructed such that the capacitance of the key varies with key position. The change in capacitance which occurs when a key is depressed or released results in a detectable change in voltage on the sense line to which the key is connected. Control logic 151 is designed to completely "scan" keys 152, i.e. test each key for a position change, approximately 100 times per second. The scanning is done incrementally by applying an excitation voltage to excitation line E1 and monitoring sense lines S0-S15 for an indication of the state of the keys to which the sense lines are connected. This procedure is repeated by stimulating, in turn, excitation lines E2 through E7. Control logic 151 compares the present sensed voltage on each line with a reference voltage, the level of which varies according to the voltage sensed on the line during the prior scan. If one or more position changes is detected, terminal 100 will be notified.

Timing for control logic 151 originates with resistor 159 and capacitor 160. The input timing signal XTALIN functions as the basis for the timing of all control logic 151 operations. CLOCKM is a clock mode signal which indicates to control logic 151 whether the source of timing signals is the RC circuit (as shown in FIG. 2) or a TTL clock (not used in this embodiment and not shown).

LED/bell information received by control logic 151 from terminal 100 is supplied to LED/bell logic 157 via lines LED0-LED6. Each LED represents a visual indication to the user of keyboard 150 or terminal 100 status. LED/bell logic 157 is described in detail below.

Language ID logic 155 is implemented as switch 161, substantially identical resistors 162, and substantially identical resistors 163. Switch 161 includes, in this embodiment, eight independent single pole, single throw switch elements. Each of the eight switch elements is connected at one end to ground and at the other end to both +5 volts, via one of resistors 162 (for example, 10K ohms), and to one of excitation lines 153, via one of resistors 163 (for example, 1M ohms).

E0-E7 are bidirectional lines. When RESET is high, lines E0-E7 are in the normal transmit mode, as described above. When RESET is asserted low, E0-E7 operate as input lines from language ID logic 155 to control logic 151. In the present embodiment, in the input mode E0 and E1 are used to identify the mode of keyboard 150 operation, while E2-E7 are reserved for language identification and spares. Switch 161 is set during manufacture of keyboard 150. The particular switch configuration will, therefore, indicate the mode and language of the keyboard.

When RESET is asserted, control logic 151 will sense the positions of switch 161 by sensing the presence or absence of the voltage on the individual lines E0-E7. RESET is asserted only at terminal 100 startup or after the timing circuitry of reset logic 108 determines that a NOTKBIRQ signal from control logic 151 is overdue. Resistors 162 and 163 (10K ohms and 1M ohms, respectively, in this embodiment) were selected to allow the positions of switch 161 to be read when lines E0-E7 of control logic 151 are in the sense mode (i.e. when RESET is received) but to preclude language ID logic 155 from interfering with proper scanning of keys 162 when E0-E7 are in the transmit mode.

Figure 3:
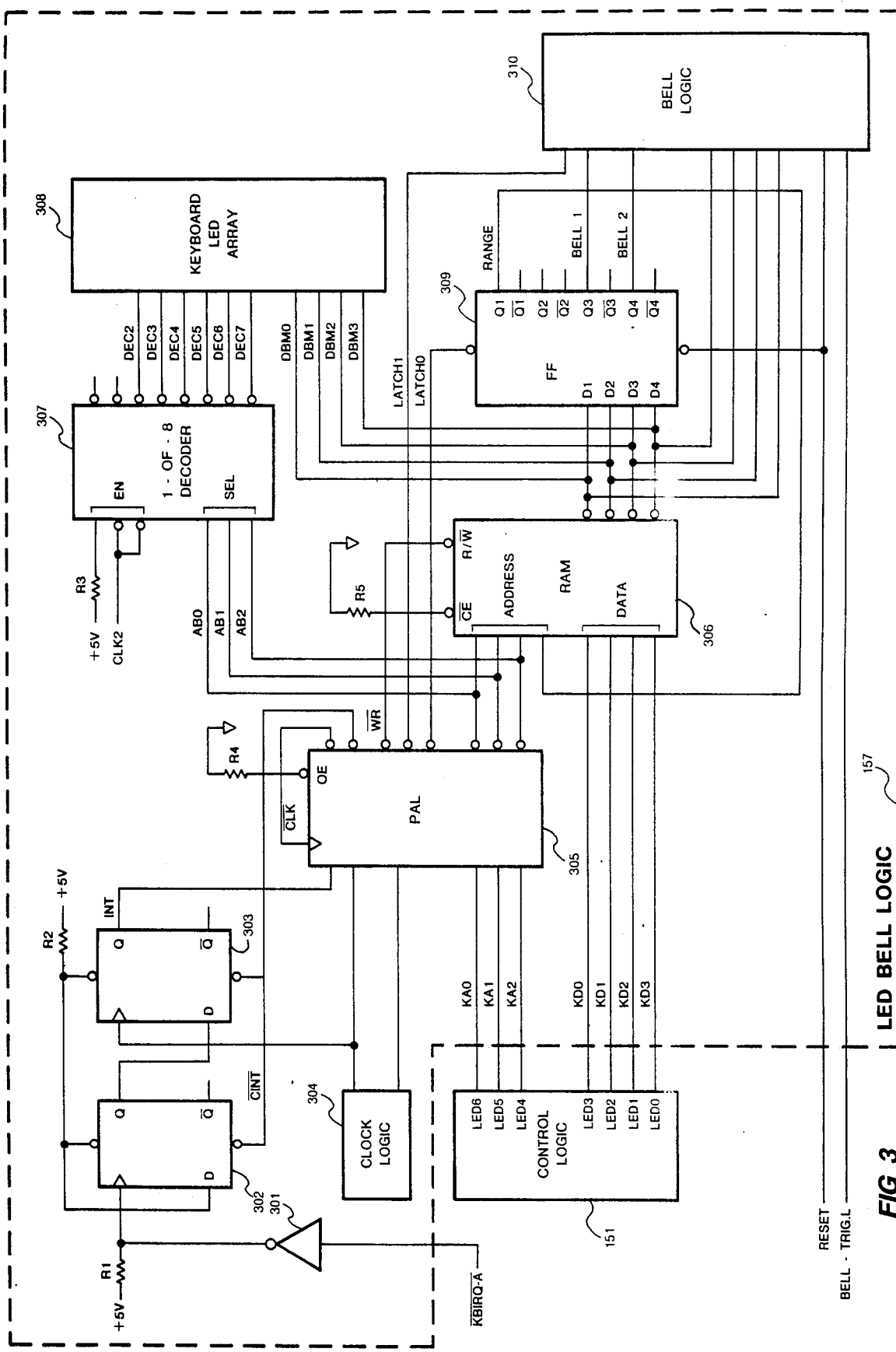
FIG. 3 is a schematic diagram of LED/bell logic 157.

Looking now at FIG. 3, a schematic diagram of LED/bell logic 157 is shown. KBIRQ-A from tri-state gate 156 is provided through inverter 301 to the clocking input of flip flop 302. The Q output of flip flop 302 is provided to the D input of flip flop 303. The Q output of flip flop 303 (INT) is provided as an input to PAL 305. The S inputs of flip flops 302 and 303 and the D input of flip flop 302 are held high. Clock logic 304, described in more detail below, provides two timing signal outputs, CLK and CLK2. CLK is provided to the clocking input of flip flop 303 and as an input to PAL 305. CLK2 is provided as an enabling input to decoder 307 and as an input to PAL 305, for example a PAL 16R4. As discussed above control logic 151 provides seven LED signals LED0-LED6 to LED/bell logic 157. LED0-LED3 are LED data signals provided directly to RAM 306, for example a 74LS89. LED-4-LED6 comprise a 3-bit address signal provided to PAL 305. PAL 305 outputs are connected to RAM 306, decoder 307, flip flop 309, bell logic 310, flip flop 302 and flip flop 303. The outputs of decoder 307, for example a 74LS138, are connected to keyboard LED array 308. Output Q1 of quad flip flop 309 is connected to the address input of RAM 306. Outputs Q3 and Q4 of quad flip flop 309 are connected to bell logic 310. The outputs of RAM 306 are connected to keyboard LED array 308, quad flip flop 309 and bell logic 310. Finally, BELL.TRIG.L from tri-state gate 156 is connected to bell logic 310 and RESET from reset logic 158 is connected to flip flop 309 and bell logic 310.

Figure 4:
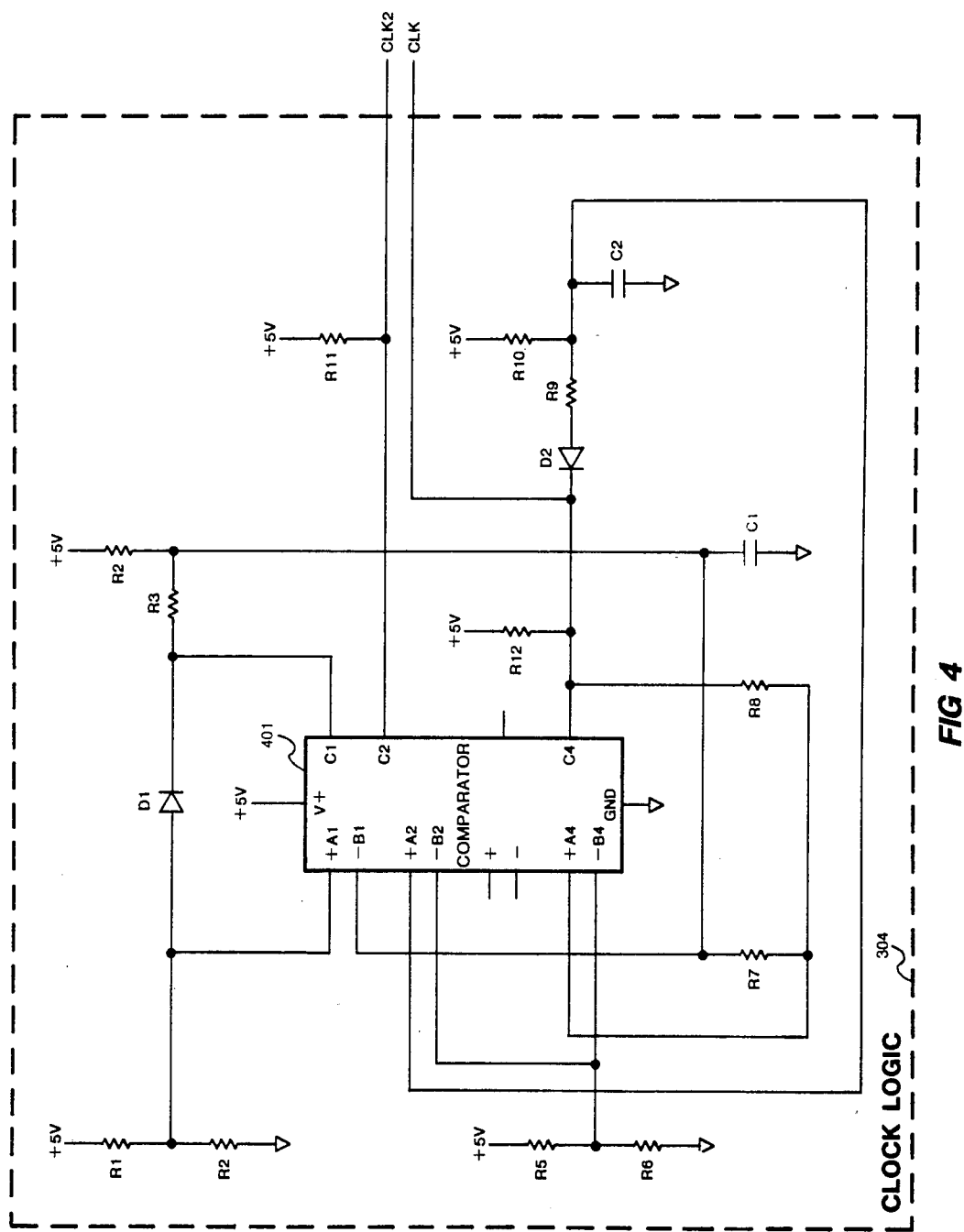
FIG. 4 is a schematic diagram of Clock Logic 304.

Turning now to FIG. 4 a schematic diagram of clock logic 304 is presented. Input A1 of comparator 401 (for example, a LM339) is connected to first ends of resistors R1 (e.g. 10K ohms) and R4 (e.g. 20K ohms) and to the anode of diode D1. Input B1 of comparator 401 is connected to first ends of resistors R2 (e.g. 20K ohms), R3 (e.g. 100 ohms) and R7 (e.g. 5.1K ohms) and to one end of capacitor C1 (e.g. 0.0022 uf). Input A2 of comparator 501 is connected to first ends of resistors R9 (e.g. 1.2K ohms) and R10 (e.g. 6.8K ohms) and to capacitor C2 (e.g. 270 pf). Input B2 of comparator 401 is connected to first ends of resistors R5 (e.g. 6.8K ohms) and R6 (e.g. 10K ohms) and to input B4 of comparator 501. Input A4 of comparator 401 is connected to one end of resistor R8 (e.g. 240K ohms) and the other end of resistor R7.

Output C1 of comparator 501 is connected to the other ends of resistor R3 and diode D1. Output C2 is connected to resistor R11 (e.g. 3K ohms). Output C4 is connected to resistor R12 (e.g. 3K ohms), the cathode end of diode D2 and the other end of resistor R8. The anode end of diode D2 is, in turn, connected to the other end of resistor R9. Resistors R1, R2, R5, R10, R11 and R12 are all connected to a voltage source, for example +5 volts. Resistors R4, R6 and capacitors C1 and C2 are connected to ground.

Figure 5:
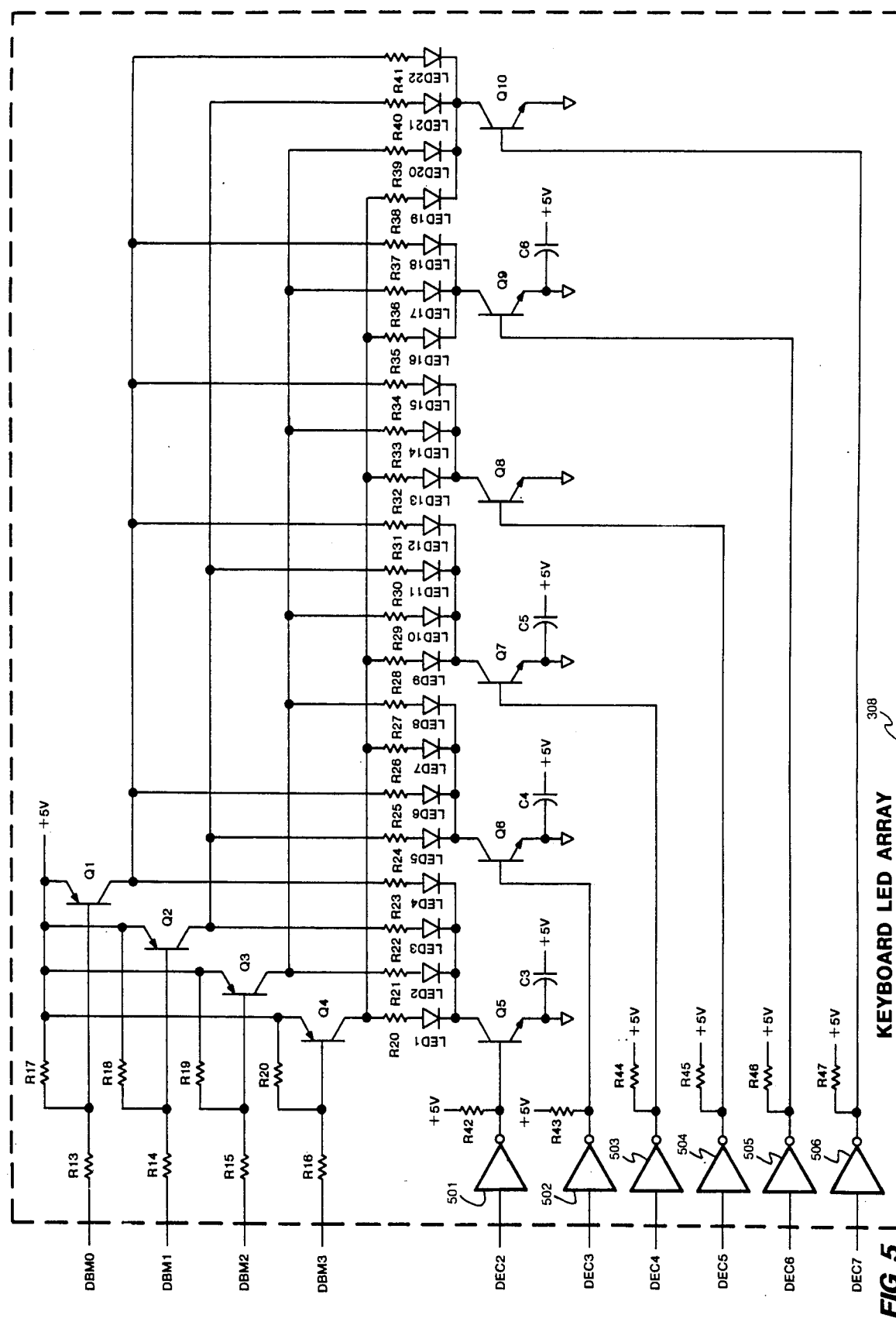
FIG. 5 is a schematic diagram of keyboard LED array 304.

FIG. 5 presents a schematic diagram of a particular implementation of keyboard LED array 308. Output signals DBM0-DBM3 from RAM 306 are provided through resistors R13-R16 (e.g. 1Kohms each) respectively to the bases of transistors Q1-Q4 respectively. Resistors R17-R20 (e.g. 240 ohms each) are connected between the emitters and the bases of transistors Q1-Q4 respectively. The outputs DEC2-DEC7 from decoder 307 are provided through inverters 501-506 respectively to the bases of transistors Q5-Q10 respectively. The bases of Q5-Q10 are also connected to a +5 volt power source through resistors R42-R47 (e.g. 1Kohms each) respectively. The particular embodiment shown in FIG. 5 incorporates twenty-two LED's. Each LED is connected in series with a resistor in the set R20-R41 between the collector of one of the transistors in the set Q1-Q4 and the collector of one of the transistors in the set Q5-Q10 such that if any one of the transistors Q1-Q4 is turned on and any one of the transistors Q5-Q10 is turned on, no more than 1 of the LED's will be activated. The signals DBM0-DBM3 and DEC-2-DEC7, therefore, control the on-off status of LED-1-LED22. To avoid erroneous LED activation only one of the DEC2-DEC7 lines can be low at any given time.

Operation

Looking at FIGS. 4 and 6, clock logic 304 creates a two-phase clock signal, CLK and CLK2, for driving LED/bell logic 107. CLK is generated by comparing a sawtooth wave form at input A2 with a voltage selected by resistor R5 and R6 at input B2. The sawtooth wave form is generated by charging capacitor C1 through resistors R1, R2, and R3 to a threshold voltage determined by the ratio of resistor R1 to resistor R4 and then discharging C2 through resistor R3 into the open collector output of comparator 401. When capacitor C1 has discharged to a lower threshold level, the cycle is repeated. Hysteresis is provided by resistors R7 and R8 to ensure a clean clock edge.

The CLK2 phase delay "d" is provided by resistors R9 and R10, capacitor C2 and diode D2. The time it takes capacitor C2 to charge to the divider voltage set by resistors R5 and R6 sets the delay for the leading edge of CLK2. A high-to-low transition of CLK discharges C2 through R9 and D2. The discharge time from 5 volts to the divider voltage sets the trailing edge delay time for CLK2.

Looking now at FIGS. 3, 5, and 6 together the operation of LED/bell logic 157 will be discussed. As stated above, LED/bell logic 157 receives seven parallel bits of LED information from control logic 151 and a reset signal from reset logic 158. It also receives a bell trigger signal, BELL.TRIG.L, and a keyboard interrupt request signal, NOTKBIRQ-A, from tri-state gate 156. The seven bits of LED information are organized such that LED0-LED3 are data bits while LED4-LED6 represent an address location in RAM 306.

As mentioned above, RAM 306, in this implementation, is a 16 word by 4 bit memory, which is organized as 2 pages of 8 words by 4 bits, each page having a complete set of LED and bell control bits. Selection between the 2 pages is controlled by RANGE, the Q1 output of flip flop 309. To support the 22 LED's of this implementation only 6 of the 8 available 4-bit words in a RAM 306 page are required. The remaining 2 4-bit words are available for use with other information such as bell volume control bits, bell tone control bits and a page select bit (RANGE).

Prior to continuing the discussion of the overall operation of LED/bell Logic 157, the general relationship between the inputs and outputs of PAL 305 will be addressed. Referring to FIG. 3, PAL 305 receives as inputs CLK, CLK2, KA0-KA2 and INT, an interrupt signal indicating that keyboard interrupt request KBIRQ-A has been received by LED/bell logic 157. Based on the status of these inputs, PAL 305 generates the outputs $\overline{CLK}$ $\overline{CINT}$ $\overline{WR}$ AB0-AB2, LATCH0 and LATCH1. $\overline{CLK}$ is the inverted CLK waveform and is supplied to the clocking input of PAL 305. The outputs of PAL 305 will change when clocked by a rising edge of $\overline{CLK}$ (i.e. falling edge of CLK). The interrupt clear signal, $\overline{CINT}$ is the inverse of INT. $\overline{INT}$ will therefore be driven low by the rising edge of $\overline{CLK}$ ½ of a CLK period after having gone high, from flip flop 303, at the preceeding CLK rising edge. At the next rising edge of $\overline{CLK}$ INT is low and $\overline{CINT}$ will return high.

Using the notation that a "." signifies a logical "and" operation and a "+" signifies a logical "or" operation, Table I sets out the logical statements implemented in PAL 305 for determining the status of $\overline{WR}$, AB0-AB2, LATCH0 and LATCH1.

TABLE I

| | |
|---|---|
| $\overline{WR}$ = | CLK.CINT.$\overline{CLK2}$ |
| $\overline{AB0}$ = | $(AB2.AB1.AB0.\overline{INT}) + (AB1.AB0.\overline{INT}) +$ $(AB2.AB0.\overline{INT}) + (\overline{KA0.INT})$ |
| $\overline{AB1}$ = | $(AB2.AB1.AB0.\overline{INT}) + (\overline{AB1.AB0.INT}) +$ |

TABLE I-continued $$\overline{(KA1.INT)}$$

$$\overline{AB2} = \overline{(AB2.AB1.AB0.\overline{INT})} + \overline{(\overline{AB2}.AB1.\overline{AB0}.INT)} +$$
$$\overline{(\overline{AB2}.\overline{AB1}.AB0.\overline{INT})} + \overline{(KA2.INT)}$$

$$\overline{LATCH0} = \overline{AB0.AB1.\overline{AB2}.CLK}$$

$$\overline{LATCH1} = \overline{AB0.\overline{AB1}.AB2.CLK}$$

Output $\overline{WR}$ is low only when CLK is high and both CLK2 and $\overline{CINT}$ are low. The duration of $\overline{WR}$ low is, therefore, equal to the length of the phase delay between the rising edges of CLK and CLK2. If INT is high, indicating a write operation to RAM 306, inputs KA0-KA2 will appear directly on the outputs AB-0-AB2. If INT is low, AB0-AB2 will be determined by the status of AB0-AB2 at the prior CLK rising edge in accordance with the logical equations in Table I. $\overline{LATCH0}$, normally high, goes low when the KA0-KA2 address presented indicates that bell data for flip flop 309 is available on KD0-KD3. Similarly, $\overline{LATCH1}$ goes low when KA0-KA2 indicates bell data for bell logic 310 is available on KD0-KD3.

Looking at the case where INT is low (i.e. no data is being supplied to LED/bell logic 157 from terminal 100), the AB0-AB2 addresses generated by PAL 305 will cycle among only the 6 addresses which refer to LED data in RAM 306. Therefore, at each rising edge of $\overline{CLK}$ a different address AB0-AB2 is presented to the address inputs of RAM 306 and the select inputs of decoder 307. A different set of signals DEC2-DEC7 and DBM0-DBM3 are, therefore, presented to keyboard LED array 308 each CLK period (27 microseconds in this implementation). To prevent "smearing" of data from one 4-bit word to the next because of saturation of the transistors in keyboard LED array 308, decoder 301 is enabled for only one-half of each clock period.

As implemented in this application only one of the signals DEC2-DEC7 will be high during any given CLK2 cycle. None, some, or all of the signals DMB0-DBM3 may be high simultaneously, depending on the status of the keyboard. It can be seen that any particular LED which is perceived by the operator as being "on" is in fact only activated for approximately one-twelfth of the time (i.e., for one-half of one CLK period out of every six CLK periods). Therefore, while the LED's are, in fact, blinking on and off at a very high rate the human eye integrates the light from the LED's such that they appear to be maintained constantly on and no flicker is perceived.

PAL 305 will continue to cycle through the 6 addresses of RAM 306 corresponding to the LED information until such time as a NOTKBIRQ-A signal is received. Since NOTKBIRQ-A is transmitted independently of the timing from clock logic 304, flip flops 302 and 303 serve to synchronize NOTKBIRQ-A with LED/bell logic 157 and generate sychronization signal INT to PAL 305. When PAL 305 senses INT go high, the cyclic address generation is suspended and the address KA0-KA2 is placed onto outputs AB0-AB2. As described in U.S. Pat. No. 4,459,581, NOTKBIRQ (and thus NOTKBIRQ-A) will be generated by control logic 151 at each keystroke. In addition, during periods of no keystroke activity, NOTKBIRQ-A will result from the expiration of the 80 millisecond timeout period. In response to NOTKBIRQ-A, terminal 100 will read key transition data from control logic 151 over serial line SI and will determine if a keystroke has occurred which requires modification of the status of an LED or bell. If the keystroke does not require modification of RAM 306 data or if NOTKBIRQ resulted from the 80 ms timeout, one of the eight RAM 306 locations will be updated by reentering its contents. Terminal 100 transmits the RAM 306 address and data information serially over S0 to gate 150 and on to the SOUT input of control logic 151. Control logic 151 takes the serial input and presents it to LED/bell logic 157 on lines LED-0-LED6. This rewriting will occur cyclically for each of the eight RAM addresses during periods of no keystroke activity or during periods of keystrokes which do not cause LED/bell status changes. If, however, the status of the bell information of one or more LED's will change as a result of a keystroke, the cyclic refreshing is suspended and the RAM 306 data affected will be updated. If a keystroke affects data stored at more than one RAM 306 address, the update will continue at the subsequent occurrences of NOTKBIRQ-A until the update is completed. The cyclic pattern of reentering RAM 306 data will resume when all affected RAM locations have been updated.

At the next falling edge of CLK after INT goes high, $\overline{CINT}$ goes low. This clears flip flops 302 and 303 and drives INT low again. Then, at the next rising edge of CLK, $\overline{WR}$ goes low to cause the data on lines KD0-KD3 to be stored in RAM 306 at the address indicated by AB0-AB2 and to be simultaneously provided on outputs DBM0-DBM3. At each occurrence of NOTKBIRQ-A, the 4 bits of information stored at one of the eight addresses in RAM 306 will be updated from terminal 100. In this particular implementation $\overline{WR}$ stays low for approximately one microsecond and is driven high again in response to the rising edge of CLK2. As explained above, if PAL 305 recognizes the address KA0-KA2 to be one of the two addresses signifying bell data rather than LED data, PAL 305 will generate the appropriate signal $\overline{LATCH0}$ or $\overline{LATCH1}$ to cause the bell information on DBM0-DBM3 to be latched either in flip flop 309 or in bell logic 310.

The invention may be embodied in yet other specific forms without departing from the spirit or essential characteristics thereof. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

I claim:

1. Apparatus for controlling a plurality of indicators on a keyboard operatively connected to a terminal, said keyboard having a plurality of keys, means for sensing the status of each of said keys and means for providing key status information to said terminal and said terminal having means, responsive to said key status information, for generating on/off status information for said indicators and means for providing said on/off status information to said keyboard apparatus, said keyboard apparatus comprising:

clock means for generating at least one timing signal, said signal having evenly spaced timing pulses;

logic means responsive to said timing signal for providing an address selected from a plurality of addresses, said provided address changing in response to said timing pulses such that each of said plurality of addresses is repetitively cyclically provided by said logic means;

memory means having a plurality of memory output lines and having a plurality of storage locations for retaining said information descriptive of the on/off status of each of said indicators, said memory means being responsive to said provided address for providing portions of said status information at said memory output lines in response to said provided address, each said memory output line being provided as an activation input to a portion of said indicators;

decoder means responsive to said provided address, said decoder means having a plurality of individually activatable output lines, each said decoder output line being provided as an enabling input to a portion of said indicators;

activation means responsive to the outputs of said memory means and said decoder means for controlling the on/off status of said indicators, said decoder outputs and memory outputs being connected to activate only a portion of said indicators at a time such that each indicator may be controlled independently; and means, connected to said on/off status information providing means, for revising the information in said memory means.

2. The apparatus of claim 1 wherein said revising means comprises:

means for providing an interrupt to said logic means such that the cyclical providing of addresses by said logic means is suspended when indicator status data is available for storage in said memory means;

means for providing indicator status data bits and an address where said bits are to be stored to said memory means;

means for causing said indicator status data to be stored in said memory means at said address; and means for removing said interrupt when the storing operation is completed such that the cyclical providing of addresses by said logic means in reinitiated.

3. In a keyboard including a plurality of indicators; a source of clock pulses; address generation logic responsive to said clock pulses; a memory for retaining information descriptive of the on/off status of each of said indicators, said memory being responsive to the address from said address generation logic for providing the portion of said descriptive information stored at said address; a decoder having a plurality of individually activatable output lines, said decoder activating a selected one of said output lines in response to the address from said address generator logic; and indicator activation logic connected to the output of said memory and said decoder for controlling the on/off status of said indicators, a method of controlling said plurality of indicators comprising the steps of:

(a) generating an address corresponding to one of the storage locations in said memory containing indicator information, said generation to occur such that the addresses of all storage locations containing indicator information are cyclically generated;

(b) providing the address to said memory and said decoder;

(c) enabling said decoder;

(d) providing the outputs of said memory and said decoder to said indicator activation logic;

(e) disabling said decoder;

(f) repeating (a)–(e) at each clock pulse.

4. In a keyboard including a plurality of indicators; a source of clock pulses; address generation logic responsive to said clock pulses; a memory for retaining information descriptive of the on/off status of each of said indicators, said memory being responsive to the address from said address generation logic for providing the portion of said descriptive information stored at said address; a decoder having a plurality of individually activatable output lines, said decoder activating a selected one of said output lines in response to the address from said address generator logic; and indicator activation logic connected to the output of said memory and said decoder for controlling the on/off status of said indicators, a method of controlling said plurality of indicators comprising the steps of:

(a) generating an address corresponding to one of the storage locations in said memory;

(b) supplying said address to the inputs of said memory and said decoder;

(c) supplying the outputs of said memory and said decoder to said indicator activation logic;

(d) repeating (a)–(c) at each clock pulse.

* * * * *